US010061667B2

(12) United States Patent
Sato et al.

(10) Patent No.: US 10,061,667 B2
(45) Date of Patent: Aug. 28, 2018

(54) STORAGE SYSTEM FOR A MEMORY CONTROL METHOD

(71) Applicant: HITACHI, LTD., Tokyo (JP)

(72) Inventors: Takahiro Sato, Tokyo (JP); Yuko Matsui, Tokyo (JP); Koutarou Muramatsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 165 days.

(21) Appl. No.: 15/122,202

(22) PCT Filed: Jun. 30, 2014

(86) PCT No.: PCT/JP2014/067336
§ 371 (c)(1),
(2) Date: Aug. 29, 2016

(87) PCT Pub. No.: WO2016/001962
PCT Pub. Date: Jan. 7, 2016

(65) Prior Publication Data
US 2016/0371009 A1    Dec. 22, 2016

(51) Int. Cl.
*G06F 11/20*    (2006.01)
*G06F 11/14*    (2006.01)
(Continued)

(52) U.S. Cl.
CPC ............ *G06F 11/2084* (2013.01); *G06F 3/06* (2013.01); *G06F 3/065* (2013.01); *G06F 3/0619* (2013.01);
(Continued)

(58) Field of Classification Search
CPC .......... G06F 3/065; G06F 3/06; G06F 3/0619; G06F 3/0632; G06F 3/0683; G06F 11/00; G06F 11/2094; G06F 11/1076; G06F 11/1068; G06F 12/0873; G06F 12/16; G06F 12/0804; G06F 2201/805; G06F 2201/82;
(Continued)

(56) References Cited

U.S. PATENT DOCUMENTS 5,553,230 A * 9/1996 Petersen ............... G06F 11/006
714/1
5,790,775 A * 8/1998 Marks ................ G06F 11/1658
714/5.11
(Continued)

FOREIGN PATENT DOCUMENTS

JP    05-204560 A    8/1993
JP    2003-162377 A    6/2003
(Continued)

OTHER PUBLICATIONS

International Search Report, dated Sep. 24, 2014.*
PCT International Preliminary Report, dated Aug. 7, 2016.*

*Primary Examiner* — Paul Contino
(74) *Attorney, Agent, or Firm* — Volpe and Koenig, P.C.

(57) ABSTRACT

In a storage system, a processor divides a plurality of sections that constitute a physical storage area in a storage device into primary sections and secondary sections, associates one primary section and one secondary section with each other and then manages the associated primary section and secondary section, and writes data having been written to a primary section also to a secondary section corresponding to the primary section.

8 Claims, 10 Drawing Sheets

(51) Int. Cl.
*G06F 12/08* (2016.01)
*G06F 3/06* (2006.01)
*G06F 12/16* (2006.01)
*G06F 12/0873* (2016.01)
*G06F 11/00* (2006.01)
G06F 12/0804 (2016.01)
G06F 11/10 (2006.01)

(52) U.S. Cl.
CPC .......... *G06F 3/0632* (2013.01); *G06F 3/0683* (2013.01); *G06F 11/00* (2013.01); *G06F 11/1469* (2013.01); *G06F 11/2017* (2013.01); *G06F 11/2041* (2013.01); *G06F 11/2094* (2013.01); *G06F 12/0873* (2013.01); *G06F 12/16* (2013.01); G06F 11/1076 (2013.01); G06F 12/0804 (2013.01); G06F 2201/805 (2013.01); G06F 2201/82 (2013.01); G06F 2212/1032 (2013.01); G06F 2212/222 (2013.01); G06F 2212/284 (2013.01); G06F 2212/312 (2013.01); G06F 2212/608 (2013.01); G06F 2212/7208 (2013.01)

(58) Field of Classification Search
CPC ....... G06F 2212/1032; G06F 2212/222; G06F 2212/284; G06F 2212/312; G06F 2212/608; G06F 2212/7208; G06F 11/2084; G06F 11/1469; G06F 11/2017; G06F 11/2041
See application file for complete search history.

(56) References Cited

U.S. PATENT DOCUMENTS

| | | | | |
|---|---|---|---|---|
| 6,553,510 | B1* | 4/2003 | Pekny | G11C 29/78 714/6.12 |
| 6,578,158 | B1* | 6/2003 | Deitz | G06F 11/2092 714/11 |
| 7,880,913 | B2* | 2/2011 | Ford | G06F 3/122 358/1.1 |
| 8,819,478 | B1* | 8/2014 | Madnani | G06F 11/1666 714/47.1 |
| 9,471,428 | B2* | 10/2016 | Chinnakkonda Vidyapoornachary | G06F 11/1088 |
| 10,002,059 | B2* | 6/2018 | Antony | G06F 11/2043 |
| 2001/0049768 | A1* | 12/2001 | Kato | G06F 11/1666 711/113 |
| 2003/0101317 | A1 | 5/2003 | Mizuno et al. | |
| 2004/0268116 | A1* | 12/2004 | Vasisht | G06F 11/1417 713/100 |
| 2005/0193228 | A1* | 9/2005 | Miki | G06F 11/2092 714/5.11 |
| 2006/0248308 | A1* | 11/2006 | Wang | G06F 11/2089 711/173 |
| 2007/0294598 | A1* | 12/2007 | Anderson | G06F 11/2084 714/54 |
| 2008/0005614 | A1* | 1/2008 | Lubbers | G06F 11/2092 714/11 |
| 2008/0162822 | A1 | 7/2008 | Okuyama et al. | |
| 2010/0125751 | A1* | 5/2010 | McKean | G06F 11/1662 714/5.1 |
| 2011/0029716 | A1* | 2/2011 | Moshayedi | G06F 11/1666 711/103 |
| 2011/0041016 | A1* | 2/2011 | O'Connell | G06F 11/1048 714/711 |
| 2012/0011326 | A1* | 1/2012 | Higashijima | G06F 12/0804 711/142 |
| 2012/0084610 | A1* | 4/2012 | Sun | G06F 3/0614 714/54 |
| 2012/0173799 | A1* | 7/2012 | Kuno | G06F 21/445 711/103 |
| 2012/0173953 | A1* | 7/2012 | Flynn | G06F 8/665 714/758 |
| 2012/0317354 | A1* | 12/2012 | Yokota | G06F 3/0625 711/113 |
| 2013/0042053 | A1* | 2/2013 | Huang | G06F 11/106 711/103 |
| 2013/0219125 | A1* | 8/2013 | Kusters | G06F 12/0871 711/136 |
| 2013/0318358 | A1* | 11/2013 | Wang | G06F 21/31 713/182 |
| 2014/0223445 | A1* | 8/2014 | Beckmann | G06F 9/5011 718/104 |
| 2014/0245427 | A1* | 8/2014 | Nagai | G06F 21/44 726/16 |
| 2015/0286544 | A1* | 10/2015 | Kadri | G06F 11/2043 714/13 |
| 2015/0293824 | A1* | 10/2015 | Peters | G11C 16/3445 714/6.11 |

FOREIGN PATENT DOCUMENTS

| | | |
|---|---|---|
| JP | 2008-165573 A | 7/2008 |
| JP | 2010-176201 A | 8/2010 |
| JP | 2013-510360 A | 3/2013 |
| JP | 2014-026376 A | 2/2014 |

* cited by examiner

Fig. 9

| No | Situation | Unit ID | Unit ID in SSD | Controller ID | Controller ID in SSD | Restoration feasibility |
|---|---|---|---|---|---|---|
| 1 | Normal startup after scheduled stop | AAAA | AAAA | BBBB | BBBB | YES |
| 2 | Only SSD replaced | AAAA | (NULL) | BBBB | (NULL) | NO |
| 3 | Only controller replaced | AAAA | AAAA | DDDD | BBBB | YES |
| 4 | Only unit replaced | CCCC | AAAA | BBBB | BBBB | YES |
| 5 | SSD and controller replaced | AAAA | (NULL) | DDDD | (NULL) | NO |
| 6 | SSD and unit replaced | CCCC | (NULL) | BBBB | (NULL) | NO |
| 7 | Unit and controller replaced | CCCC | AAAA | DDDD | BBBB | NO |
| 8 | Initial startup | AAAA | (NULL) | BBBB | (NULL) | NO |

STORAGE SYSTEM FOR A MEMORY CONTROL METHOD

TECHNICAL FIELD

The present invention generally relates to storage control and specifically relates to, for example, storage controller technology.

BACKGROUND ART

Conventionally, configuration information, a computer program, and the like (hereinafter, referred to as "configuration information and the like") related to a storage system have been stored in a flash memory provided in a storage controller (hereinafter, referred to as a "controller"). However, with increasing capacity and higher performance of storage systems, a volume of configuration information and the like has increased and can no longer be stored in a flash memory. Therefore, storing configuration information and the like in an SSD (solid state drive) provided in a controller for storing cache data (referred to as a "cache SSD") instead of in a flash memory is being evaluated (PTL 1, PTL 2).

CITATION LIST

Patent Literature

[PTL 1]
Japanese Patent Application Publication No. 2003-162377
[PTL 2]
Japanese Patent Application Publication No. 2008-165573

SUMMARY OF INVENTION

Technical Problem

However, with an SSD to be a storage destination of configuration information and the like, there is a high probability of occurrence of a "bad page" which is a state where read and write can no longer be performed on a given page by its very nature. In addition, in a configuration in which an SSD is attachable to and detachable from a controller and the controller is similarly attachable to and detachable from a storage system, there is a risk that an SSD containing configuration information and the like of a given storage system may be mistakenly mounted to another storage system.

In consideration thereof, an object of the present invention is to provide a highly-reliable storage area in a storage device such as an SSD in which a bad page is liable to occur. Another object of the present invention is to prevent configuration information and the like of another storage system from being mistakenly used in a configuration in which configuration information and the like is stored in an attachable and detachable storage device or the like.

Solution to Problem

A storage system according to an example includes a processor and a storage device, wherein the processor is configured to: divide a plurality of sections that constitute a physical storage area in the storage device into primary sections and secondary sections, associate one primary section and one secondary section with each other and then manage the associated primary section and secondary section, and write data having been written to a primary section also to a secondary section corresponding to the primary section.

Advantageous Effects of Invention

According to the present invention, a highly-reliable storage area can be provided in a storage device such as an SSD in which a bad page is liable to occur. In addition, according to the present invention, configuration information and the like of another storage system can be prevented from being mistakenly used in a configuration in which configuration information and the like is stored in an attachable and detachable storage device.

BRIEF DESCRIPTION OF DRAWINGS

FIG. 9 shows a table of an example of a replacement pattern.

DESCRIPTION OF EMBODIMENTS

Hereinafter, an example will be described.

Although information will be described below using expressions such as an "xxx table", information may be expressed by any kind of data structure. In other words, an "xxx table" can also be referred to as "xxx information" in order to show that information is not dependent on data structure.

In addition, in the following description, since a computer program causes prescribed processing to be performed while using at least one of a storage resource (for example, a memory) and a communication interface device as appropriate by being executed by a processor (for example, a CPU (central processing unit)), a processor or an apparatus including the processor may be used as a subject of processing. Processing to be performed by a processor may be partially or entirely performed by a hardware circuit. A computer program may be installed from a program source. The program source may be a program distribution server or a storage medium (for example, a portable storage medium).

EXAMPLE 1

Figure 1:
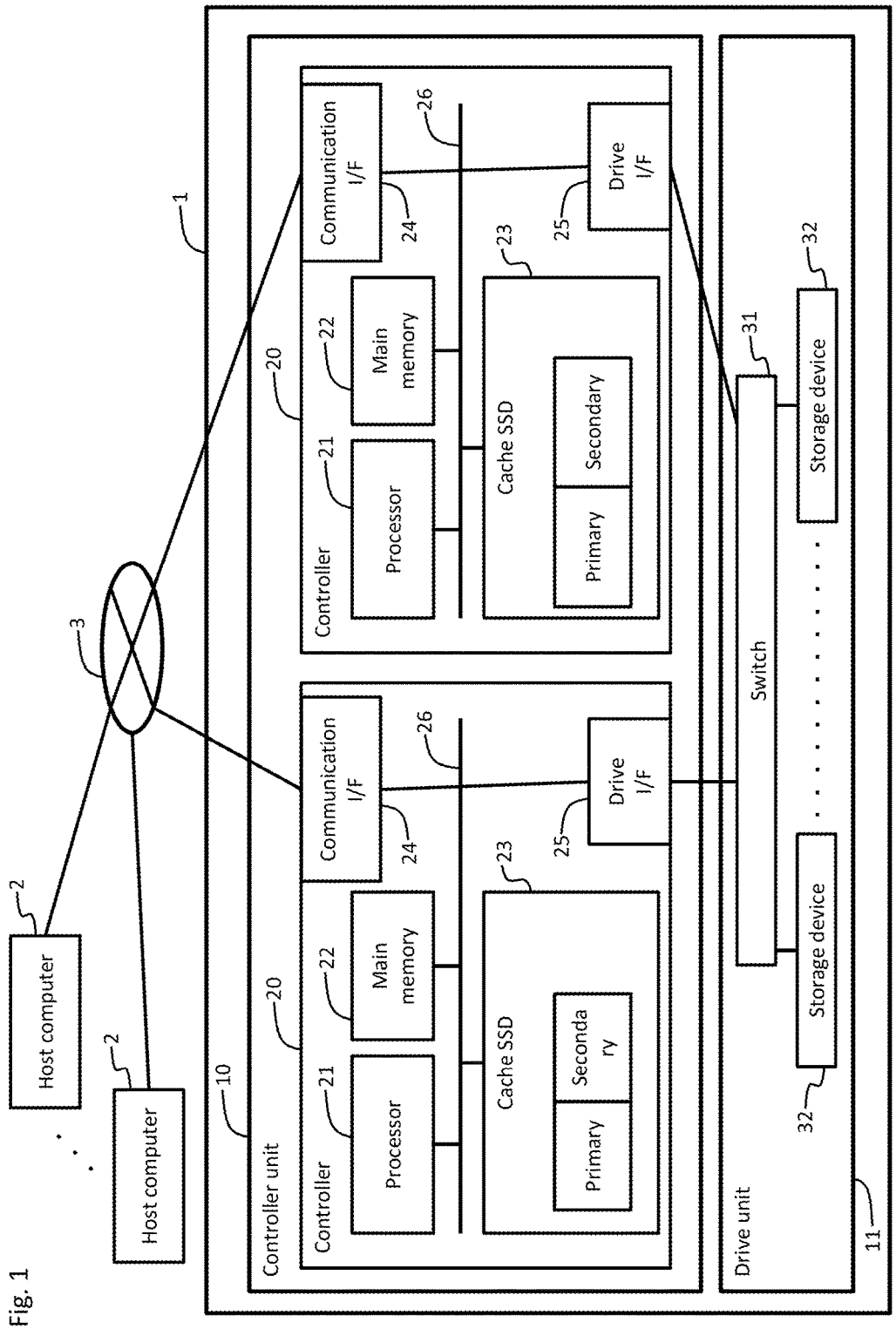
FIG. 1 shows a configuration example of a storage system according to example 1.

FIG. 1 shows a configuration example of a storage system according to example 1.

A host computer 2 is coupled to the storage system 1 via a communication network 3. The storage system 1 provides the host computer 2 with a logical volume as a data storage area. The storage system 1 stores data in accordance with a write request transmitted from the host computer 2. The storage system 1 transmits desired data to the host computer 2 in accordance with a read request transmitted from the host computer 2. Examples of the communication network 3 include a SAN (storage area network), a LAN (local area network), and the Internet.

The storage system 1 includes a controller unit 10 provided with one or two or more controllers 20 and a drive unit 11 provided with a switch 31 and a plurality of storage devices 32.

In the drive unit 11, the plurality of storage devices 32 are coupled to the switch 31. Examples of the storage device 32 include an HDD (hard disk drive) and an SSD.

The controller 20 controls a storage area of the storage device 32. The controller 20 writes data to the storage area of the storage device 32 in accordance with a write request transmitted from the host computer 2 and reads desired data from the storage area of the storage device 32 in accordance with a read request transmitted from the host computer 2. The controller 20 includes a processor 21, a main memory 22, a cache SSD 23, a communication I/F (interface) 24, and a drive I/F 25, and the elements 21 to 25 are coupled to each other by an internal bus 26 which enables two-way data communication.

The processor 21 executes a computer program in the main memory 22 and realizes functions provided by the storage system 1 (the controller 20).

The main memory 22 stores a computer program, data, and the like to be used by the processor 21, the communication I/F 24, the drive I/F 25, and the like. Examples of the main memory 22 include a DRAM (dynamic random access memory), an MRAM (magnetoresistive random access memory), and a FeRAM (ferroelectric random access memory).

The communication I/F 24 is an I/F for coupling the controller 20 to the communication network 3. In other words, the controller 20 exchanges data with the host computer 2 via the communication I/F 24. For example, when the communication network 3 is constituted by a SAN and the internal bus 26 is constituted by PCIe (PCI Express), the communication I/F 24 may be equipped with functions of an adapter capable of conversion between the Fibre Channel protocol and the PCIe protocol.

The drive I/F 25 is an I/F for coupling the drive unit 11 to the controller 20. In other words, the controller 20 exchanges data with the storage device 32 via the drive I/F 25.

The cache SSD 23 stores cache data. In order to enhance response performance with respect to the host computer 2, the controller 20 stores data related to a read request and a write request in the cache SSD 23 as cache data.

In addition, the cache SSD 23 also stores a computer program and configuration information and the like (collectively referred to as "configuration information and the like") which have conventionally been stored in a flash memory. Configuration information refers to information related to a configuration of the storage system 1. For example, configuration information is information representing a configuration of a RAID group based on a plurality of the storage devices 32. For example, configuration information is information which associates a logical volume address and a physical volume address with each other.

The cache SSD 23 is an SSD constituted by, for example, a plurality of NAND flash memory chips. A physical storage area of the SSD is constituted by a plurality of blocks and each block is constituted by a plurality of pages. In addition, the SSD must write data in page units and erase data in block units. Furthermore, with an SSD, by its very nature, there is a higher probability of an occurrence of a "bad page" as compared to an HDD. A bad page may be, for example, a page in which a certain type of error or a prescribed type of error has occurred a prescribed number of times or more. A prescribed type of error may be, for example, an error where correctable or uncorrectable data garbling has occurred in read data.

SSDs include high-performance SSDs and low-performance SSDs. A high-performance SSD is generally capable of providing a logical space and allocating a physical page to a logical area that is an access destination in the logical space or managing a bad physical page and preventing the bad physical page from being allocated to a logical area. A low-performance SSD simply provides a plurality of physical pages and does not provide a logical space nor manage a bad physical page. A low-performance SSD has an advantage of lower cost than a high-performance SSD. The cache SSD 23 according to the present example may be such a low-performance SSD.

The plurality of pages constituting a physical storage area included in the cache SSD 23 are divided into a primary page area (which may also be referred to as a "primary side") and a secondary page area (which may also be referred to as a "secondary side"). In addition, one primary page and one secondary page are associated with each other. For example, when the storage area is constituted by pages with page numbers "1" to "2000", the pages with page numbers "1" to "1000" may be divided into the primary page area and the pages with page numbers "1001" to "2000" may be divided into the secondary page area. In addition, the primary page with the page number "1" and the secondary page with the page number "1001" are associated with each other. In a similar manner, the primary page with the page number "2" and the secondary page with the page number "1002" are associated with each other. Furthermore, same data is stored in a primary page and a secondary page which correspond to each other. Accordingly, even when a failure occurs in one of the pages and the page becomes unreadable, data can be read from the other page corresponding to the failed page.

Only a partial storage area of the physical storage area included in the cache SSD 23 may be divided into a primary page area and a secondary page area. In addition, for example, only important data such as configuration information may be stored in the partial storage area divided into a primary page area and a secondary page area. Furthermore, cache data related to read and write may be stored in other storage areas. Erasure of configuration information and the like from the cache SSD 23 may cause reliability and availability of the storage system 1 to decline. However, even if cache data is erased from the cache SSD 23, the cache data may be read from the RAID once again. In addition, by dividing the storage area into primary pages and secondary pages and reducing the storage area to be managed, a period of time required for a "secondary page inspection process" shown in FIG. 7 (to be described later) can be reduced.

Figure 2:
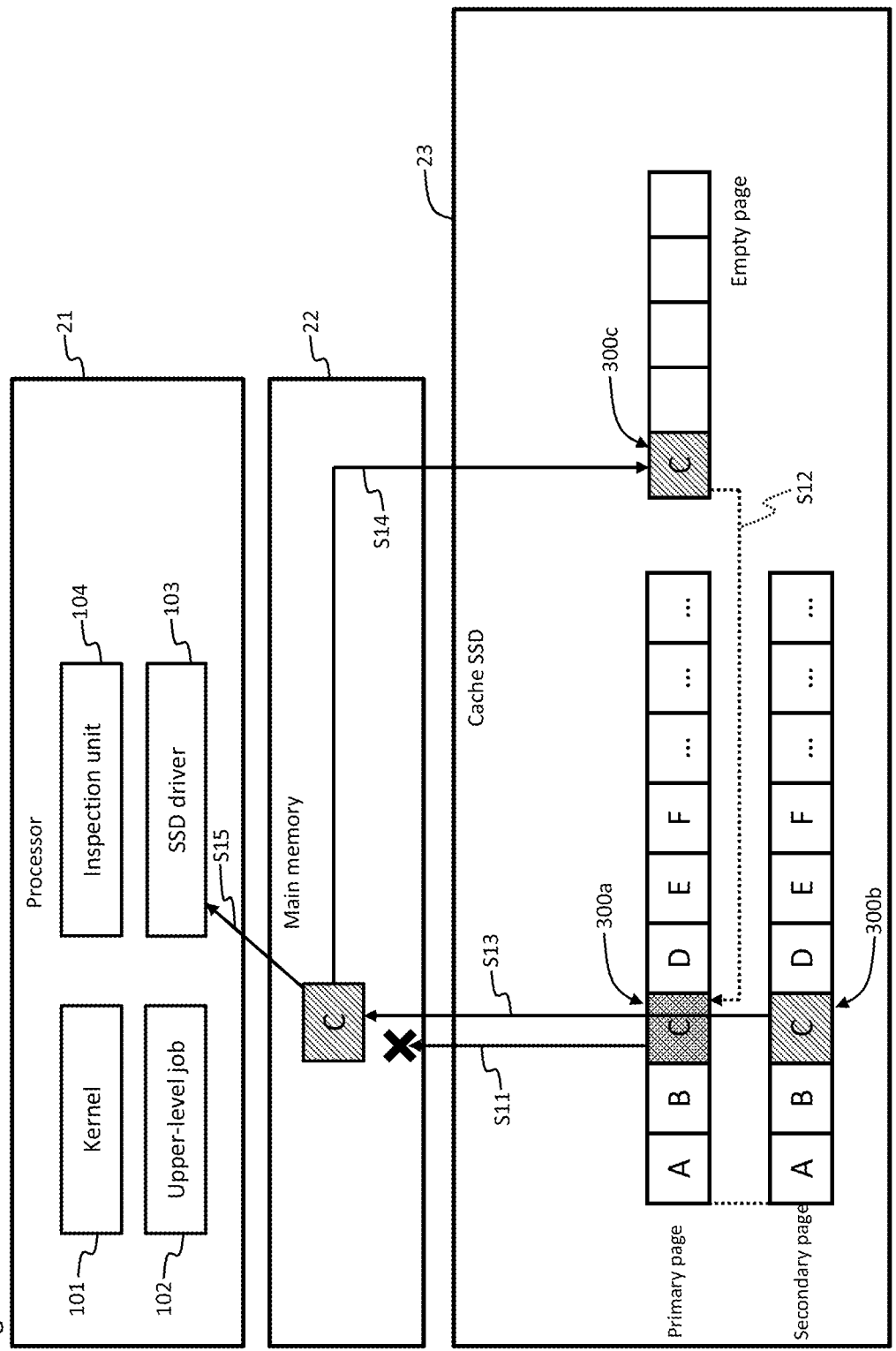
FIG. 2 shows an outline of processing in a case where a bad page is detected during a read process with respect to a cache SSD.

FIG. 2 shows an outline of processing by the processor 21 in a case where a bad page is detected during a read process with respect to the cache SSD 23.

The processor 21 can execute a kernel 101, an upper-level job 102, an SSD driver 103, and an inspection unit 104 as types of computer programs. The kernel 101 includes basic functions (an I/O function, a resource control function, and the like) of operations of the controller 20. The upper-level job 102 includes functions for controlling the SSD driver 103 based on indications received from the kernel 101.

The SSD driver 103 includes functions for controlling the cache SSD 23. For example, the SSD driver 103 includes functions for writing data to the cache SSD 23 and reading data from the cache SSD 23. In addition, as will be described later, the SSD driver 103 includes a function for allocating an empty page in place of a bad page. An empty page refers to a page from which data has been erased and to which new data is writable. Empty pages for allocation are secured in advance in the cache SSD 23 and the SSD driver 103 may allocate any of the secured empty pages. Alternatively, the SSD driver 103 may allocate any of the empty pages at the time of allocation.

The inspection unit 104 includes a function of inspecting the presence or absence of a failure in the primary pages and secondary pages in the cache SSD 23. Details of the inspection unit 104 will be provided later (refer to FIG. 7).

Next, processing in which the SSD driver 103 reads data from a primary page 300a with a page number of "3" will be described with reference to FIG. 2.

(S11) The SSD driver 103 having received a read command from the upper-level job 102 reads data from the primary page 300a with the page number of "3". At this point, when the primary page 300a is bad and data cannot be read, the SSD driver 103 performs the following processing.

(S12) The SSD driver 103 allocates a spare page 300c to the page number "3" in place of the bad primary page 300a. In other words, the spare page 300c becomes a new primary page of the page number "3".

(S13) The SSD driver 103 reads data "C" from a secondary page 300b (for example, with a page number of "1003") corresponding to the page number "3" and stores the data "C" in the main memory 22.

(S14) The SSD driver 103 writes the data "C" in the main memory 22 to the new primary page 300c of the page number "3".

(S15) The SSD driver 103 returns the data "C" in the main memory 22 to the upper-level job 102 as a response to the read command.

Alternatively, in the processing described above, the SSD driver 103 may execute S13 and S15 before S12. This is to enhance response performance with respect to the upper-level job 102. In addition, the SSD driver 103 may execute the processes of S13 and S15 and the processes of S12 and S14 in parallel.

According to the processing described above, even if a primary page is bad, the SSD driver 103 can read data from a secondary page corresponding to the primary page and return the data to the upper-level job 102. In other words, the SSD driver 103 can hide the fact that the read destination primary page was bad from the upper-level job 102. In addition, the SSD driver 103 can inspect and restore a bad page through a read process. Furthermore, the SSD driver 103 can also restore duplexing of data when detecting a bad page during a read process.

Figure 3:
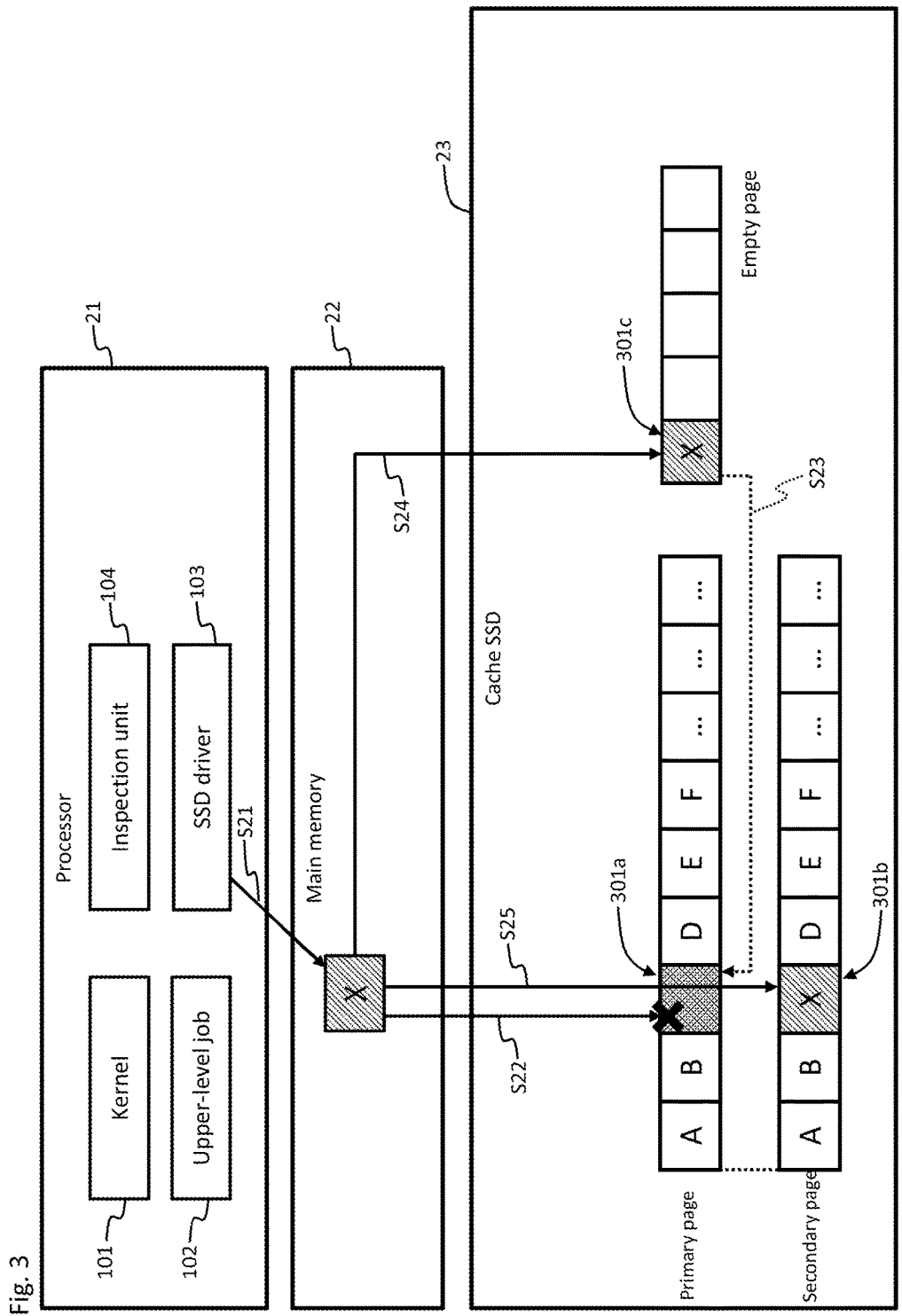
FIG. 3 shows an outline of processing in a case where a bad page is detected during a write process with respect to the cache SSD.

FIG. 3 shows an outline of processing of the processor 21 in a case where a bad page is detected during a write process with respect to the cache SSD 23.

Processing in which the SSD driver 103 writes data to a primary page 301a with a page number of "3" will be described with reference to FIG. 3.

(S21) The SSD driver 103 having received a write command from the upper-level job 102 stores data "X" in the main memory 22.

(S22) The SSD driver 103 writes the data "X" to the primary page 301a with the page number "3". At this point, when the primary page 301a with the page number "3" is bad and the data "X" cannot be written, the SSD driver 103 performs the following processing.

(S23) The SSD driver 103 allocates a spare page 301c to the page number "3" in place of the bad primary page 301a. In other words, the spare page 301c becomes a new primary page of the page number "3".

(S24) The SSD driver 103 writes the data "X" in the main memory 22 to the secondary page 301b corresponding to the page number "3". (S25) The SSD driver 103 writes the data "X" in the main memory 22 to the new primary page 300c of the page number "3" and returns a completion response to the upper-level job 102.

Alternatively, in the processing described above, the SSD driver 103 may execute S25 before S23 and S24. This is to enhance response performance with respect to the upper-level job 102. In addition, the SSD driver 103 may execute the processes of S23 and S24 and the process of S25 in parallel.

According to the processing described above, even if a primary page is bad, the SSD driver 103 can write data to a secondary page corresponding to the primary page and return a completion response to the upper-level job 102. In other words, the SSD driver 103 can hide the fact that the write destination primary page was bad from the upper-level job 102. In addition, the SSD driver 103 can inspect and restore a bad page through a write process. Furthermore, the SSD driver 103 can also restore duplexing of data when detecting a bad page during a write process.

Figure 4:
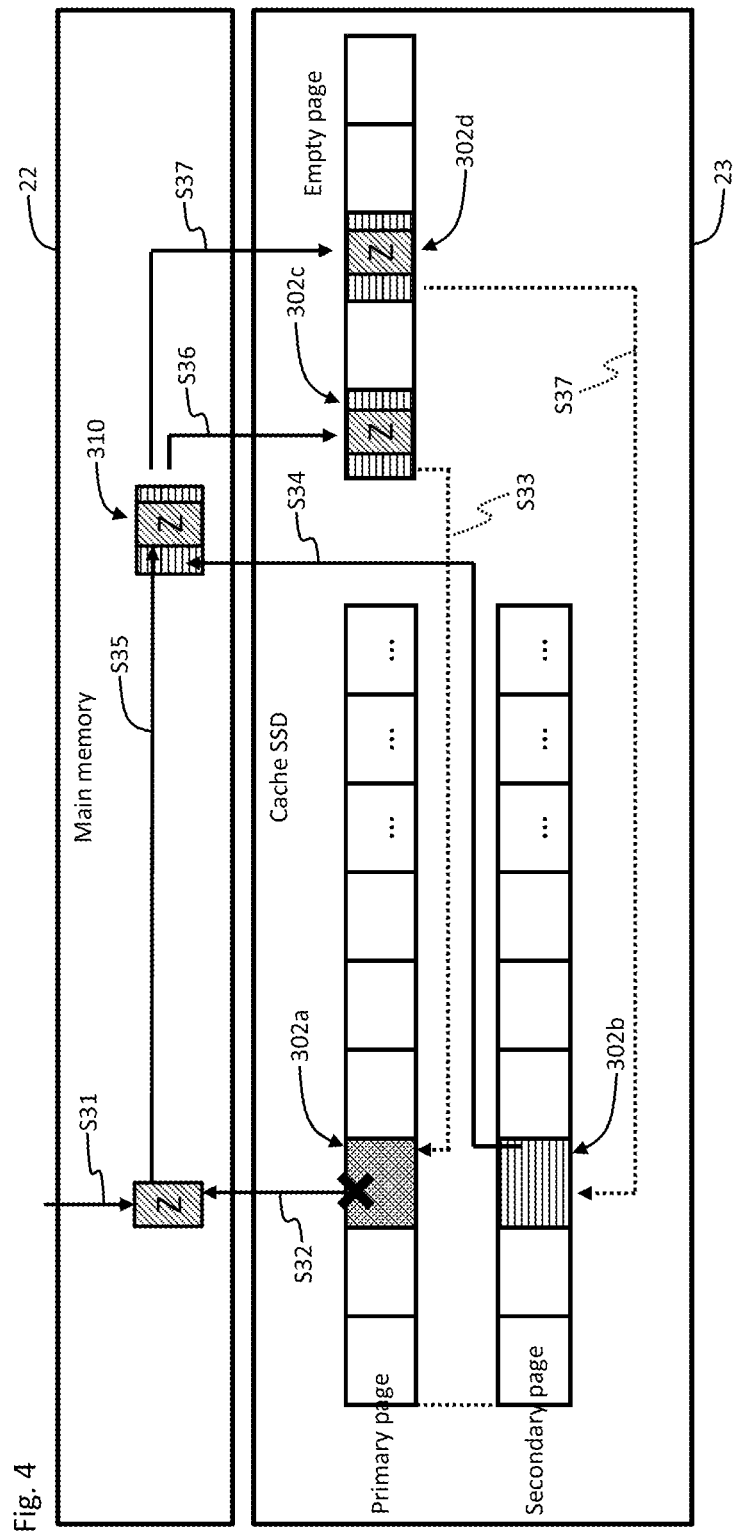
FIG. 4 shows an outline of processing for overwriting a page already storing data with new data.

FIG. 4 shows an outline of processing for overwriting a page already storing data with new data.

A flash memory characteristically does not enable a page already storing data to be directly overwritten with new data. In addition, there may be cases where a size of data that is a write target is smaller than a page size. Hereinafter, processing in such cases will be described.

(S31) The SSD driver 103 having received a write command from the upper-level job 102 stores data "Z" in the main memory 22. In this case, it is assumed that a size of the data "Z" is smaller than a page size.

(S32) The SSD driver 103 reads stored data from a primary page 302a with the page number "3". At this point, when the primary page 302a with the page number "3" is bad and data cannot be read, the SSD driver 103 performs the following processing.

(S33) The SSD driver 103 allocates a spare page 302c to the page number "3" in place of the bad primary page 302a. In other words, the spare page 302c becomes a new primary page of the page number "3".

(S34) The SSD driver 103 reads stored data from a secondary page 302b corresponding to the page number "3" and stores the read data in the main memory 22.

(S35) The SSD driver 103 overwrites the stored data read from the secondary page 302b with the write target data "Z" and generates composite data 310.

(S36) The SSD driver 103 writes the composite data 310 in the main memory 22 to the new primary page 302c of the page number "3".

(S37) In addition, the SSD driver 103 allocates a new secondary page 302d to a page number of, for example, "1003" that corresponds to the primary page with the page number "3" and writes the composite data 310 in the main memory 22 to the secondary page 302d.

According to the processing described above, a primary page and a secondary page can be overwritten with data. Moreover, the processing shown in FIG. 4 may be performed when writing data to an empty page.

Figure 5:
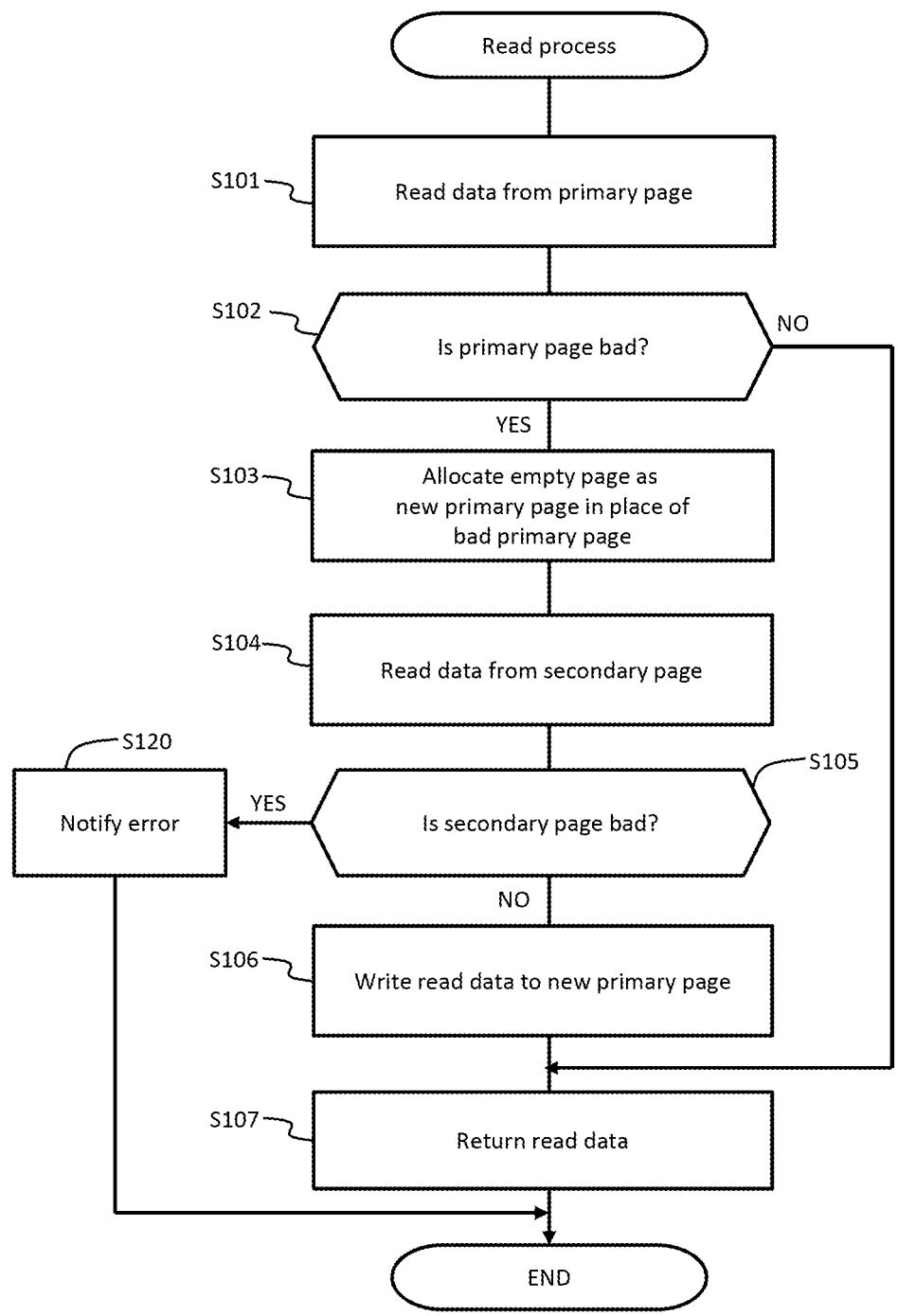
FIG. 5 shows a flow chart of an example of a read process with respect to the cache SSD.

FIG. 5 shows a flowchart of an example of a read process with respect to the cache SSD 23. FIG. 5 corresponds to details of the processing shown in FIG. 2.

When the SSD driver 103 receives a read command from the upper-level job 102, the SSD driver 103 performs the following processing. The SSD driver 103 reads data from a primary page with a page number specified by the read command (referred to as a "target page number") (S101).

When the primary page is not bad (S102: NO) and data can be read successfully, the SSD driver 103 returns the read data to the upper-level job 102 (S106) and ends processing (END).

On the other hand, when the primary page is bad (S102: YES) and data cannot be read successfully, the SSD driver 103 performs the following processing.

The SSD driver 103 allocates an empty page to the target page number in place of the bad primary page (S103). The newly allocated empty page will be referred to as a "new primary page".

The SSD driver 103 reads data from a secondary page corresponding to the primary page (S104). At this point, when the secondary page is also bad (S105: YES) and data cannot be read successfully, the SSD driver 103 returns an error notification to the upper-level job 102 (S120) and ends processing (END).

On the other hand, when the secondary page is not bad (S105: NO) and data can be read successfully, the SSD driver 103 writes the data read from the secondary page to the new primary page of the target page number (S106). At this point, the SSD driver 103 may confirm whether or not data has been successfully written on the new primary page. For example, the SSD driver 103 may determine that data has been successfully written when data is read from the new primary page and the read data matches the data written earlier.

The SSD driver 103 returns the data read from the secondary page to the upper-level job 102 (S107) and ends processing (END).

Figure 6:
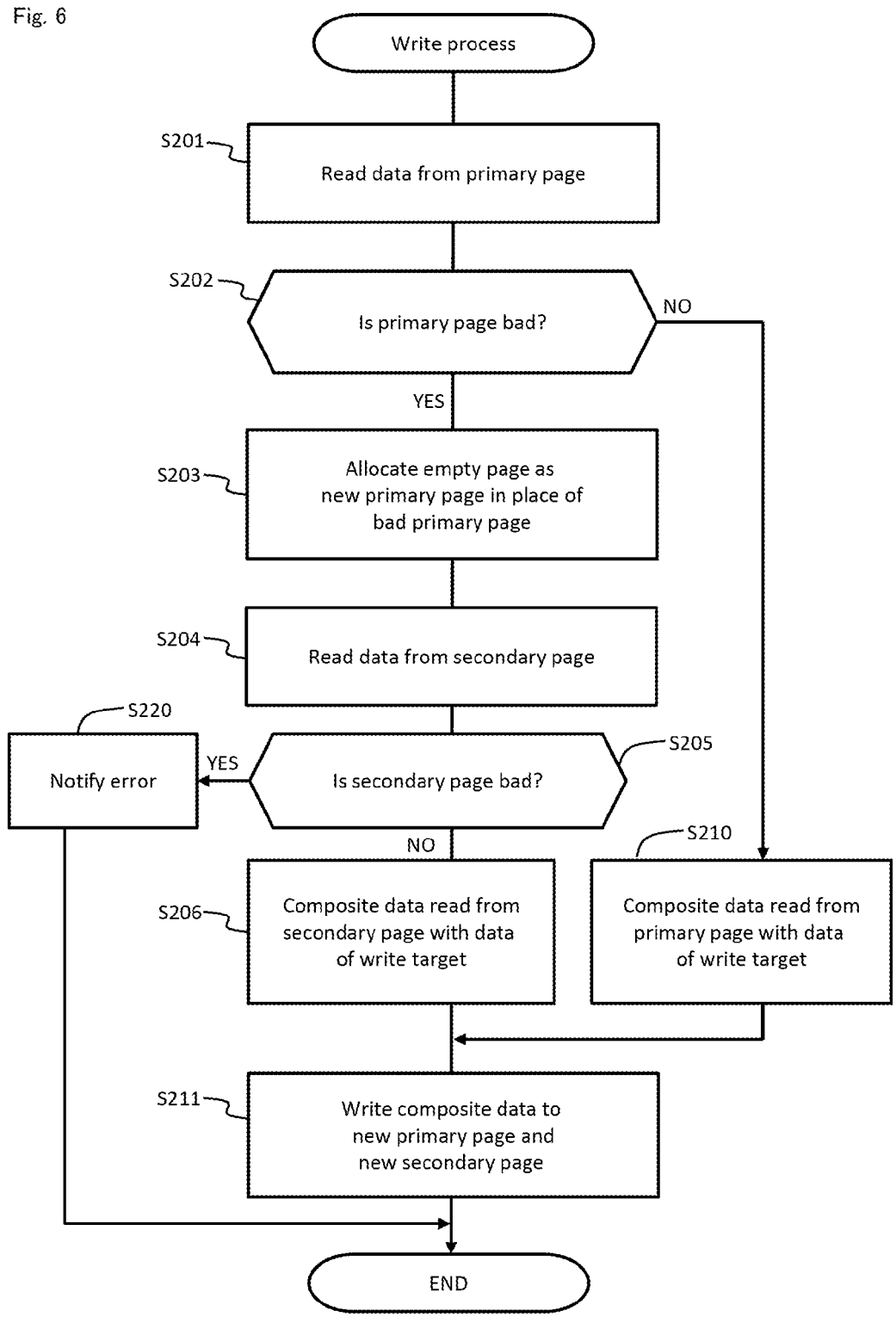
FIG. 6 shows a flow chart of an example of a write process with respect to a cache SSD 23.

FIG. 6 shows a flow chart of an example of a write process with respect to the cache SSD 23. FIG. 6 corresponds to details of the processing shown in FIG. 3.

When the SSD driver 103 receives a write command and write data from the upper-level job 102, the SSD driver 103 performs the following processing. The SSD driver 103 reads data from a primary page with a page number specified by the write command (referred to as a "target page number") (S201).

At this point, when the primary page is not bad (S202: NO) and data can be read successfully, the SSD driver 103 composes the data read from the primary page and the write target data with each other (overwrites the read data with the write target data) to generate composite data (S210). In addition, the SSD driver 103 writes the composite data to a new primary page and a new secondary page corresponding to the target page number (S211) and ends the processing (END).

On the other hand, when the primary page is bad (S202: YES) and data cannot be read successfully, the SSD driver 103 performs the following processing.

The SSD driver 103 allocates an empty page to the target page number in place of the bad primary page (S203). The newly allocated empty page will be referred to as a "new primary page".

The SSD driver 103 reads data from a secondary page corresponding to the primary page (S204). At this point, when the secondary page is also bad (S205: YES) and data cannot be read successfully, the SSD driver 103 returns an error notification to the upper-level job 102 (S220) and ends processing (END).

On the other hand, when the primary page is not bad (S205: NO) and data can be read successfully, the SSD driver 103 composes the data read from the secondary page and the write target data with each other to generate composite data (S206).

In addition, the SSD driver 103 writes the composite data to a new primary page and a new secondary page corresponding to the target page number (S211). At this point, the SSD driver 103 may confirm whether or not composite data has been successfully written on the new primary page and the new secondary page. For example, the SSD driver 103 may determine that the composite data has been successfully written when composite data is read from the new primary page and the new secondary page and the read composite data matches the composite data written earlier. Subsequently, the SSD driver 103 ends the processing (END).

Figure 7:
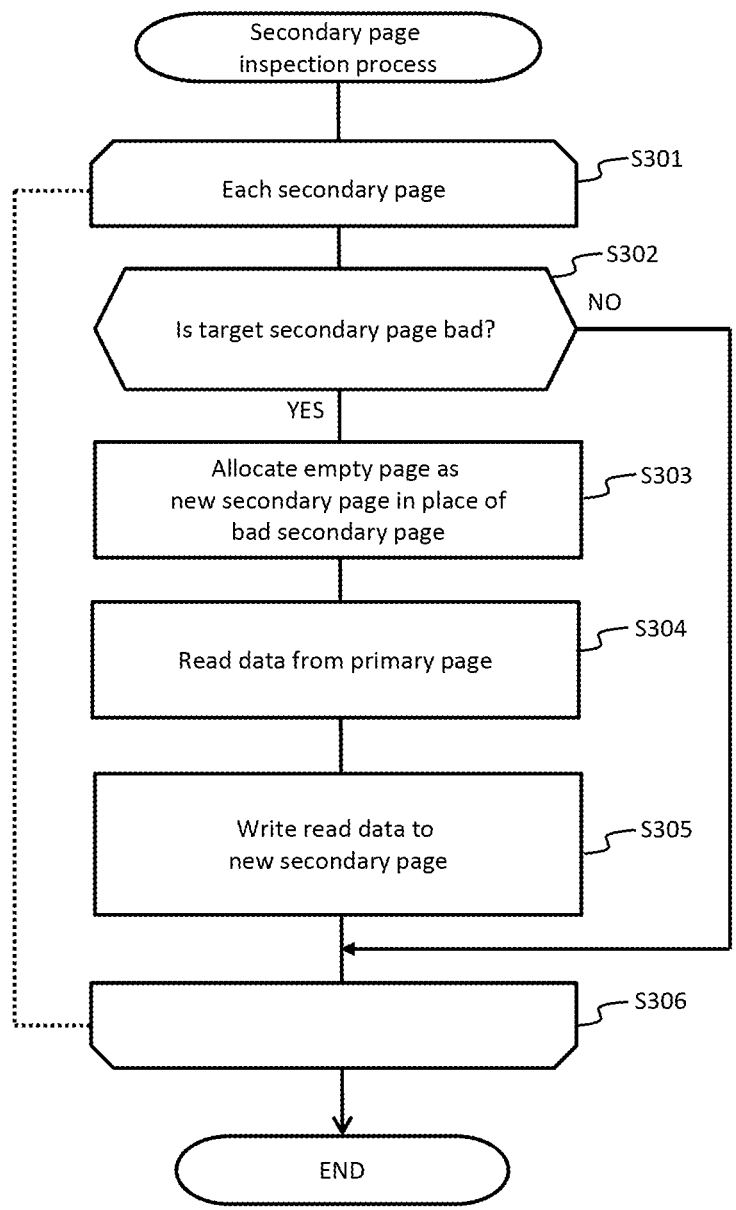
FIG. 7 shows a flow chart of an example of a secondary page inspection process.

FIG. 7 shows a flowchart of an example of a secondary page inspection process.

The inspection unit 104 performs the following secondary page inspection process at prescribed timings (for example, once a day) in order to inspect a presence or absence of a failure in a secondary page. The inspection only targets secondary pages because a presence or absence of a failure in a primary page is inspected and may be restored at timings of a read process and a write process as described above. However, the inspection unit 104 may inspect primary pages in a similar manner to secondary pages.

The inspection unit 104 performs the processes of S301 to S306 on each secondary page of the cache SSD 23. In this case, a secondary page that is a processing target of each inspection will be referred to as a "target secondary page".

The inspection unit 104 determines a presence or absence of a failure in a target secondary page (S302). When the target secondary page is not bad (S302: NO), the inspection unit 104 advances to S306.

When the target secondary page is bad (S302: YES), the inspection unit 104 performs the following processing. The inspection unit 104 allocates an empty page to a target page number related to the target secondary page in place of the bad target secondary page (S303). The newly allocated empty page will be referred to as a "new target secondary page".

The inspection unit 104 reads data from a primary page corresponding to the target secondary page (S304).

The inspection unit 104 writes the data read from the primary page to the new target secondary page (S305). At this point, the inspection unit 104 may confirm whether or not data has been successfully written on the new target secondary page. For example, the inspection unit 104 may determine that data has been successfully written when data is read from the new target secondary page and the read data matches the data written earlier.

After performing S301 to S306 on all secondary pages (S306), the inspection unit 104 ends the processing (END).

Accordingly, a failure of the secondary page is restored and duplexing of data is maintained. In other words, reliability of the cache SSD 23 is improved.

For example, the present example provides the following operational advantages.

(1) When a primary page and a secondary page according to the present example are respectively provided in different SSDs, I/O processing between the primary page and the secondary page including the need to perform exclusive processing and the need to make I/O requests to another controller significantly affects system performance. In contrast, since a primary page and a secondary page are provided in one SSD and processing is performed on the SSD driver 103 in the present example, the effect of I/O processing between the primary page and the secondary page on system performance is insignificant.

(2) By only providing a portion of a necessary storage area in an entire storage area of the cache SSD 23 with a two-side configuration of a primary page and a secondary page and limiting a target area of the restoration shown in FIG. 6 to secondary pages, a period of time required for the restoration process shown in FIG. 6 can be shortened and a processing load created by the restoration process can be reduced.

EXAMPLE 2

Figure 8:
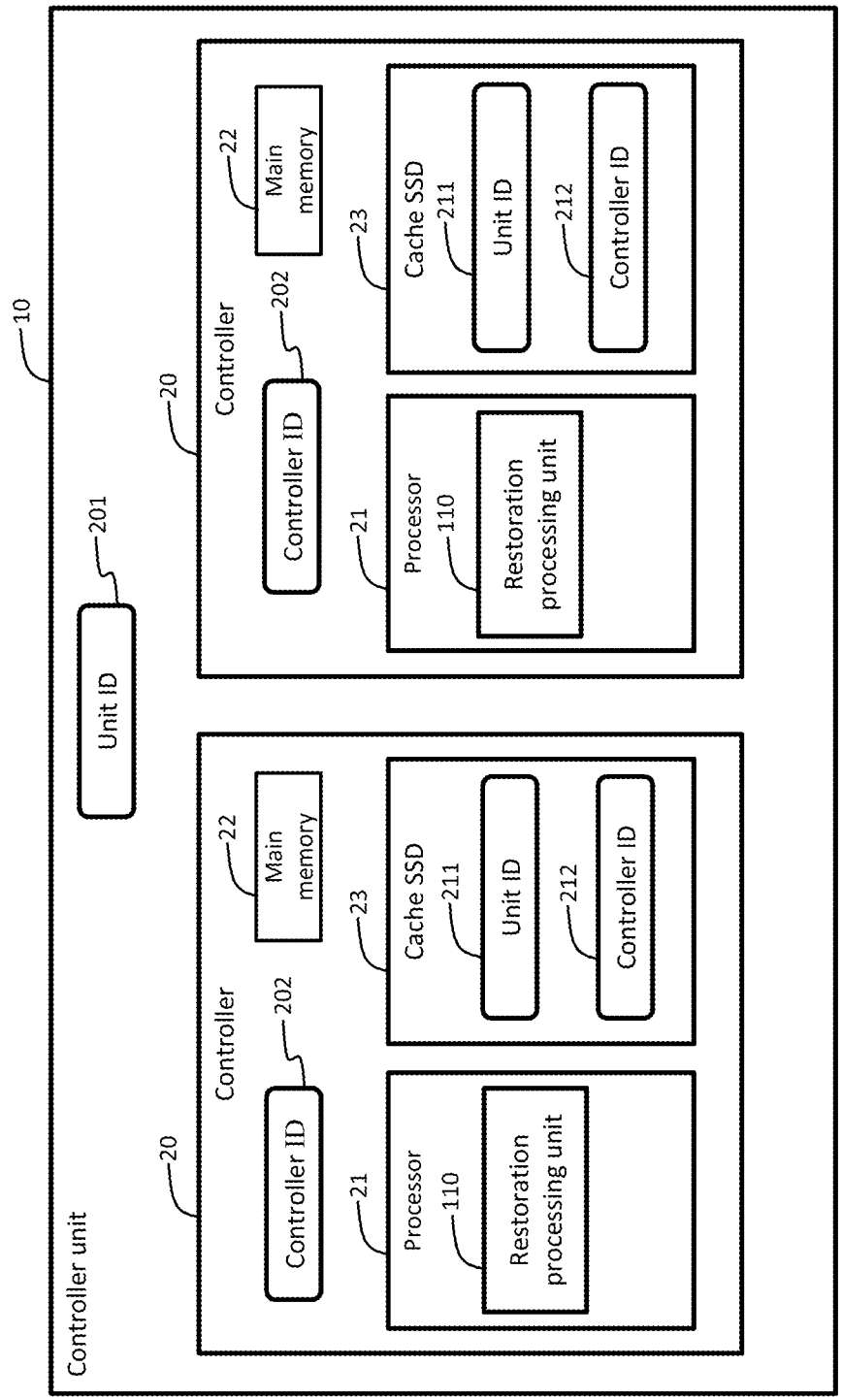
FIG. 8 shows a configuration example of a controller unit of a storage system according to example 2.

FIG. 8 shows a configuration example of the controller unit 10 of the storage system 1 according to example 2.

The storage system 1 is configured such that the controller 20 is attachable and detachable to and from the controller unit 10. In addition, the cache SSD 23 is configured so as to be attachable and detachable to and from the controller 20. The cache SSD 23 stores a computer program to be executed by the processor 21, configuration information related to the storage system, and the like. Therefore, when the controller 20 or the cache SSD 23 is replaced, configuration information stored in the cache SSD 23 may not be consistent with an actual configuration of the storage system 1. The present example prevents such inconsistent configuration information from being restored and used.

The controller unit 10 has a unit ID 201 that enables the controller unit 10 to be identified. In addition, the controller 20 also has a controller ID 202 that enables the controller 20 to be identified. When the controller 20 and the cache SSD 23 are newly mounted to the controller unit 10, the controller 20 stores its own controller ID 202 and the unit ID 201 of the controller unit 10 to which it belongs in the cache SSD 23 (refer to a unit ID 211 and a controller ID 212 shown in FIG. 8).

A restoration processing unit 110 executed by the processor 21 restores a computer program and configuration information and the like stored in the cache SSD 23 to the main memory 22 upon startup of the storage system 1 and allows the processor 21 to continue using the configuration information and the like. At this point, when the restoration processing unit 110 determines that the controller 20 or the cache SSD 23 has been replaced, the restoration processing unit 110 does not restore the configuration information and the like stored in the cache SSD 23 to the main memory 22 and does not allow use of the configuration information and the like. This is because inconsistency with the actual configuration of the storage system 1 may arise.

In other words, the restoration processing unit 110 determines whether or not the cache SSD 23 has been replaced by comparing the controller ID 202 of its own controller 20 with the controller ID 212 stored in the cache SSD 23. In addition, the restoration processing unit 110 determines whether or not its own controller 20 has been replaced by comparing the unit ID 201 of the controller unit 10 to which its own controller 20 belongs with the unit ID 211 stored in the cache SSD 23.

FIG. 9 shows a table 800 that represents an example of a replacement pattern.

In table 800, for example, a record 821 represents that when an ID (803) of a controller unit to which it belongs and a unit ID (804) stored in a cache SSD match each other and an ID (805) of its own controller and a controller ID (806) stored in the cache SSD match each other, a determination may be made that a normal restart after a scheduled stop (802) has been performed and that the cache SSD 23 and the controller 20 have not been replaced. Therefore, when the record 821 applies, the restoration processing unit 110 may determine that the configuration information and the like stored in the cache SSD 23 are restorable (807) to the main memory 22.

For example, records 822, 825, 826, and 828 represent that when neither a unit ID (804) nor a controller ID (806) is stored in the cache SSD 23 (when NULL), a determination may be made that at least the cache SSD 23 has been replaced (802) or that the storage system 1 has been started up for the first time (802). Therefore, when any or the records 822, 825, 826, and 828 apply, the restoration processing unit 110 may determine that the configuration information and the like stored in the cache SSD 23 are not restorable (807) to the main memory 22.

For example, a record 823 represents that when an ID (803) of a controller unit to which it belongs and a unit ID (804) stored in a cache SSD match each other and an ID (805) of its own controller and a controller ID (806) stored in the cache SSD do not match each other, a determination may be made that the cache SSD 23 has not been replaced and only the controller 20 has been replaced (802). Therefore, when the record 823 applies, the restoration processing unit 110 may determine that the configuration information and the like stored in the cache SSD 23 are restorable (807) to the main memory 22.

For example, a record 824 represents that when an ID (803) of a controller unit to which it belongs and a unit ID (804) stored in the cache SSD 23 do not match each other and an ID (805) of its own controller and a controller ID (806) stored in the cache SSD 23 match each other, a determination may be made that the cache SSD 23 has not been replaced and only the controller unit 10 has been replaced (802). Therefore, when the record 824 applies, the restoration processing unit 110 may determine that the configuration information and the like stored in the cache SSD 23 are restorable (807) to the main memory 22.

For example, a record 827 represents that when an ID (803) of a controller unit to which it belongs and a unit ID (804) stored in the cache SSD 23 do not match each other and an ID (805) of its own controller and a controller ID (806) stored in the cache SSD 23 also do not match each other, a determination may be made that the controller unit 10 and the controller 20 have been replaced (802). Therefore, when the record 827 applies, the restoration processing unit 110 may determine that the configuration information and the like stored in the cache SSD 23 are not restorable (807) to the main memory 22.

Figure 10:
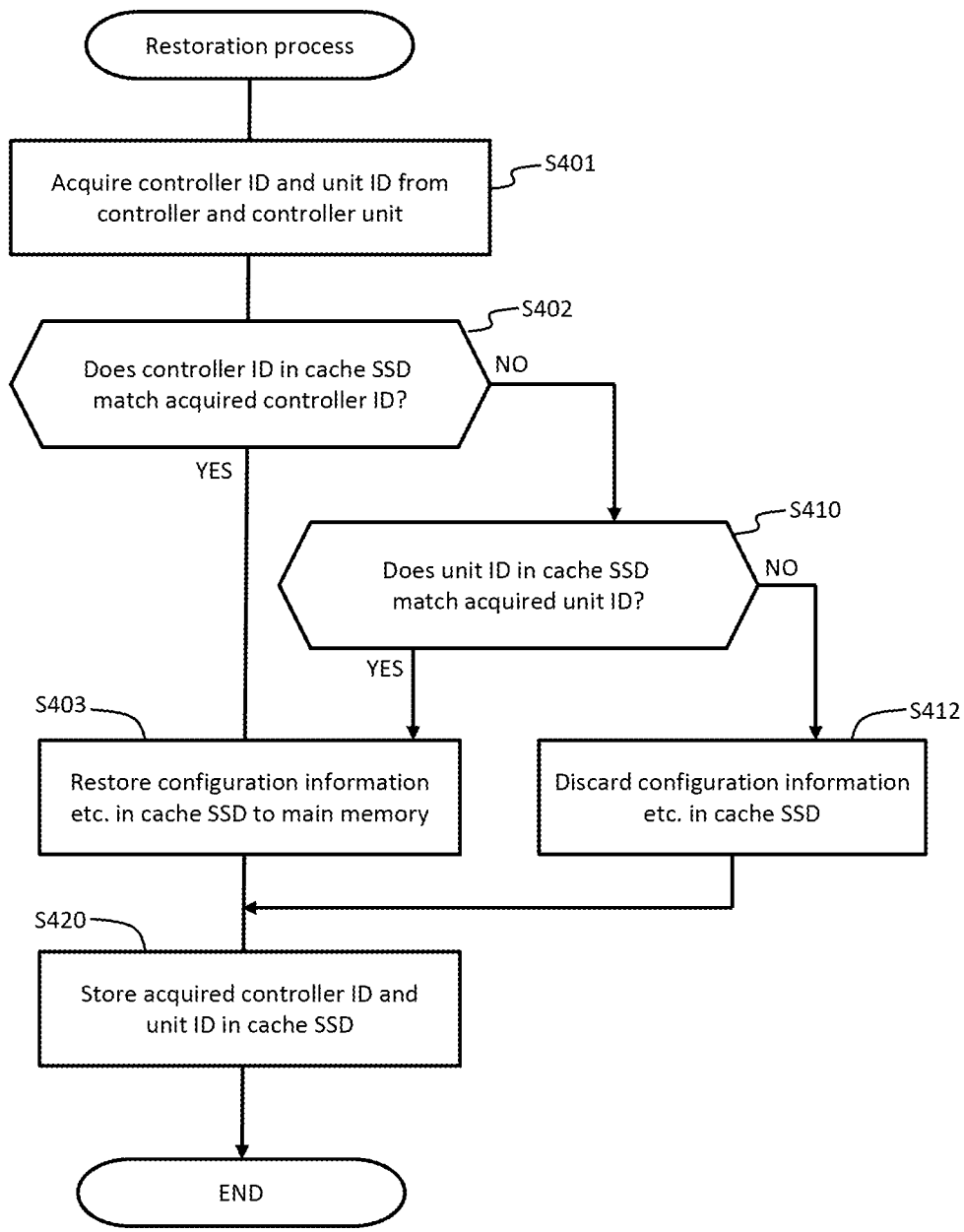
FIG. 10 shows a flow chart of an example of a restoration process.

FIG. 10 shows a flow chart of an example of a restoration process.

The restoration processing unit 110 acquires a controller ID of its own controller and an ID of a controller unit to which its own controller belongs (S401).

The restoration processing unit 110 determines whether or not the acquired controller ID and a controller ID in a cache SSD match each other (S402).

When the acquired controller ID and the controller ID in the cache SSD match each other (S402: YES), the restoration processing unit 110 restores the configuration information and the like stored in the cache SSD to the main memory 22 (S403) and advances to S420.

When the acquired controller ID and the controller ID in the cache SSD do not match each other (S402: NO), the restoration processing unit 110 next determines whether or not the acquired unit ID and a unit ID in the cache SSD match each other (S410).

When the acquired unit ID and the unit ID in the cache SSD match each other (S410: YES), the restoration processing unit 110 restores the configuration information and the like stored in the cache SSD to the main memory 22 (S403) and advances to S420.

When the acquired unit ID and the unit ID in the cache SSD do not match each other (S410: NO), the restoration processing unit 110 discards (deletes) the configuration information and the like stored in the cache SSD (S412) and advances to S420.

In S420, the restoration processing unit 110 stores (updates and registers) the acquired controller ID and the acquired unit ID in the cache SSD and ends the processing (END).

According to the processing described above, the restoration processing unit 110 can prevent configuration information and the like which are not consistent with an actual configuration of the storage system 1 from being restored and, at the same time, enables configuration information and the like which are consistent with the actual configuration of the storage system 1 to be restored.

The examples described above merely represent examples for illustrating the present invention, and it is to be understood that the scope of the present invention is not limited to the examples. It will be obvious to those skilled in the art that the present invention can be implemented in various other modes without departing from the spirit of the present invention.

The present example described above can be expressed as follows.

<Expression 1>

A storage system including:

a processor; and a storage device, wherein the processor is configured to:

divide a plurality of sections that constitute a physical storage area in the storage device into primary sections and secondary sections, and associate one primary section and one secondary section with each other and then manage associated primary section and secondary section, and write data having been written to a primary section also to a secondary section corresponding to the primary section.

<Expression 2>

The storage system according to Expression 1, wherein the processor is configured to manage a partial storage area in the physical storage area of the entire storage device by dividing the partial storage area into a primary section and a secondary section.

<Expression 3>

The storage system according to Expression 2, wherein the processor is configured to store in the partial storage area configuration information that is information related to a configuration of the storage system and to store in another storage area cache data used in read and write processes.

<Expression 4>

The storage system according to any one of Expressions 1 to 3, wherein the storage device is an SSD (solid state drive) constituted by a plurality of flash memories.

<Expression 5>

The storage system according to any one of Expressions 1 to 4, wherein when a first primary section that is a read destination ends up being a failure, the processor is configured to read data from a first secondary section corresponding to the first primary section, write the read data to a writable empty section, and associate a new first primary section that is the empty section, to which the data has been written, with the first secondary section in place of the first primary section.

<Expression 6>

The storage system according to Expression 5, wherein the processor is configured to read data from the new first primary section and to determine whether or not the read data and data read from the first secondary section match each other.

<Expression 7>

The storage system according to any one of Expressions 1 to 6, wherein when a second primary section that is a write destination ends up being a failure, the processor is configured to write data to a second secondary section corresponding to the second primary section, write the written data to a writable empty section, and associate a new second primary section that is the empty section, to which the data has been written, with the second secondary section in place of the second primary section.

<Expression 8>

The storage system according to any one of Expressions 1 to 7, wherein when a third primary section that is a write destination ends up being a failure, the processor is configured to read data from a third secondary section corresponding to the third primary section, generate composite data by overwriting the read data with write target data, write the composite data to a writable empty section, and associate a new third primary section that is the empty section, to which the composite data has been written, with the third secondary section in place of the third primary section.

<Expression 9>

The storage system according to any one of Expressions 1 to 8, wherein the processor is configured to inspect a failure in each of the plurality of secondary sections and, when a fourth secondary section ends up being a failure, read data from a fourth primary section corresponding to the fourth secondary section, write the read data to a writable empty section, and associate a new fourth secondary section that is the empty section, to which the data has been written, with the fourth primary section in place of the fourth secondary section.

<Expression 10>

The storage system according to anyone of Expressions 1 to 9, further including:

a controller; and a unit, wherein the controller is assigned a controller ID and is provided with the processor and the storage device that is attachable and detachable, the unit is assigned a unit ID and is provided with the controller that is attachable and detachable, and when a controller ID stored in the storage device and a controller ID assigned to a controller to which the processor belongs do not match other and, at the same time, a unit ID stored in the storage device and a unit ID assigned to a unit to which the processor belongs do not match other, the processor is configured not to allow use of the configuration information stored in the partial storage area in the storage device.

<Expression 11>

The storage system according to Expression 10, wherein when a controller ID stored in the storage device and a controller ID assigned to a controller to which the processor belongs match other or when a unit ID stored in the storage device and a unit ID assigned to a unit to which the processor belongs match other, the processor is configured to allow use of the configuration information stored in the partial storage area in the storage device.

<Expression 12>

The storage system according to Expression 10 or 11, wherein when the processor decides not to allow use of the configuration information, the processor is configured to store in the storage device a controller ID assigned to a controller to which the processor belongs and a unit ID assigned to a unit to which the processor belongs.

<Expression 13>

A storage control method for a processor and a storage device provided in a storage system, the storage control method including:

dividing a plurality of sections that constitute a physical storage area in the storage device into primary sections and secondary sections, and associating one primary section and one secondary section with each other and then managing the associated primary section and secondary section; and writing data having been written to a primary section also to a secondary section corresponding to the primary section.

In the expressions presented above, a "section" may correspond to a "page" as used in the present example. In addition, a "storage device" may correspond to the "cache SSD 23" as used in the present example.

REFERENCE SIGNS LIST

1 Storage system
2 Host computer
10 Controller unit
11 Drive unit
20 Controller
21 Processor
22 Main memory
23 Cache SSD
32 Storage device

The invention claimed is:

1. A storage system comprising:
a processor; and
a storage device that is an SSD (solid state drive) constituted by a plurality of flash memories, wherein
the processor is configured to:
divide a plurality of sections that constitute a prescribed partial storage area among a plurality of sections that constitute a physical storage area in the storage device into primary sections and secondary sections, and associate one primary section and one secondary section with each other and then manage the associated primary section and secondary section;
store in the partial storage area configuration information that is information related to a configuration of the storage system and store in another storage area cache data used in read and write processes;
write data having been written to a primary section also to a secondary section corresponding to the primary section;
determine whether or not a first primary section among the plurality of sections constituting the partial storage area ends up being a failure when reading data related to the configuration information from the first primary section, and when a determination is made that the first primary section ends up being a failure, the processor is configured to read data from a first secondary section corresponding to the first primary section, write the read data to a writable empty section, and associate a new first primary section that is the empty section, to which the data has been written, with the first secondary section in place of the first primary section; and
read data from the new first primary section and to determine whether or not the read data and data read from the first secondary section match each other.

2. The storage system according to claim 1, wherein:
when a second primary section that is a write destination ends up being a failure, the processor is configured to write data to a second secondary section corresponding to the second primary section, write the written data to a writable empty section, and associate a new second primary section that is the empty section, to which the data has been written, with the second secondary section in place of the second primary section.

3. The storage system according to claim 1, wherein:
when a third primary section that is a write destination ends up being a failure, the processor is configured to read data from a third secondary section corresponding to the third primary section, generate composite data by overwriting the read data with write target data, write the composite data to a writable empty section, and associate a new third primary section that is the empty section, to which the composite data has been written, with the third secondary section in place of the third primary section.

4. The storage system according to claim 1, wherein the processor is configured to:
inspect for a failure in each of the plurality of secondary sections and, when a fourth secondary section ends up being a failure, read data related to the configuration information from a fourth primary section corresponding to the fourth secondary section, write the read data to a writable empty section, and associate a new fourth secondary section that is the empty section, to which the data has been written, with the fourth primary section in place of the fourth secondary section.

5. The storage system according to claim 1, further comprising:
a controller; and
a unit, wherein:
the controller is assigned a controller ID and is provided with the processor and the storage device that is attachable and detachable,
the unit is assigned a unit ID and is provided with the controller that is attachable and detachable, and
when a controller ID stored in the storage device and a controller ID assigned to a controller to which the processor belongs do not match each other and, at the same time, a unit ID stored in the storage device and a unit ID assigned to a unit to which the processor belongs do not match each other, the processor is configured not to allow use of the configuration information stored in the partial storage area in the storage device.

6. The storage system according to claim 5, wherein:
when a controller ID stored in the storage device and a controller ID assigned to a controller to which the processor belongs match each other or when a unit ID stored in the storage device and a unit ID assigned to a unit to which the processor belongs match each other, the processor is configured to allow use of the configuration information stored in the partial storage area in the storage device.

7. The storage system according to claim 5, wherein:
when the processor does not allow use of the configuration information, the processor is configured to store in the storage device a controller ID assigned to a controller to which the processor belongs and a unit ID assigned to a unit to which the processor belongs.

8. A storage control method for a processor and a storage device constituted by a plurality of flash memories, with the processor and the storage device being provided in a storage system, the storage control method comprising:
dividing a plurality of sections that constitute a prescribed partial storage area among a plurality of sections that constitute a physical storage area in the storage device into primary sections and secondary sections, and associating one primary section and one secondary section with each other and then managing the associated primary section and secondary section;
storing in the partial storage area configuration information that is information related to a configuration of the storage system and store in another storage area cache data used in read and write processes;
writing data having been written to a primary section also to a secondary section corresponding to the primary section;
determining whether or not a first primary section among the plurality of sections constituting the partial storage area ends up being a failure when reading data related to the configuration information from the first primary section, and when a determination is made that the first primary section ends up being a failure, the processor is configured to read data from a first secondary section corresponding to the first primary section, write the read data to a writable empty section, and associate a new first primary section that is the empty section, to which the data has been written, with the first secondary section in place of the first primary section
reading data from the new first primary section and to determine whether or not the read data and data read from the first secondary section match each other.

* * * * *